(12) United States Patent
Sinadinos et al.

(10) Patent No.: US 9,115,840 B2
(45) Date of Patent: Aug. 25, 2015

(54) SNAP ON VIBRATION DAMPER

(75) Inventors: Stephen Sinadinos, Commerce Township, MI (US); Prakash Tuljaram Thawani, Bloomfield Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 290 days.

(21) Appl. No.: 13/537,389

(22) Filed: Jun. 29, 2012

(65) Prior Publication Data
US 2014/0001000 A1 Jan. 2, 2014

(51) Int. Cl.
*F16L 55/033* (2006.01)
*B60H 1/00* (2006.01)
*B60G 7/00* (2006.01)

(52) U.S. Cl.
CPC .......... *F16L 55/033* (2013.01); *B60H 1/00857* (2013.01); *B60G 7/001* (2013.01); *B60G 2202/135* (2013.01)

(58) Field of Classification Search
CPC .... B60G 2202/135; B60G 7/00; B60G 7/001; B60H 1/00857; F16L 55/033
USPC .............. 188/378, 379; 24/531, 462; 248/65, 248/74.2, 316.1, 316.7
See application file for complete search history.

(56) References Cited

U.S. PATENT DOCUMENTS

| | | | |
|---|---|---|---|
| 4,039,744 A * | 8/1977 | Seaquist | 174/169 |
| 5,121,894 A * | 6/1992 | Twork et al. | 248/316.7 |
| 6,347,911 B1 * | 2/2002 | Blair et al. | 405/216 |
| 6,807,986 B2 | 10/2004 | Boger | |
| 6,837,345 B1 * | 1/2005 | Lauble et al. | 188/378 |
| 7,059,353 B2 | 6/2006 | Muscat et al. | |
| 7,069,950 B1 | 7/2006 | Bittner | |
| 7,611,288 B2 | 11/2009 | Lew | |
| 7,658,350 B2 * | 2/2010 | Bauer | 248/65 |
| 7,849,705 B2 | 12/2010 | Lee et al. | |
| 8,038,104 B1 * | 10/2011 | Larkin | 248/55 |
| 8,157,223 B2 * | 4/2012 | Stau et al. | 248/74.2 |
| 8,465,087 B2 * | 6/2013 | Gerwolls et al. | 296/187.05 |
| 8,616,507 B2 * | 12/2013 | Willey | 248/74.2 |
| 2004/0238698 A1 * | 12/2004 | Shereyk et al. | 248/71 |
| 2010/0013255 A1 | 1/2010 | Mantovani et al. | |
| 2010/0244469 A1 * | 9/2010 | Gerwolls et al. | 293/120 |

FOREIGN PATENT DOCUMENTS

JP  H03-11470  4/1984
JP  S60-79071  6/1985

(Continued)

OTHER PUBLICATIONS

Office Action issued Jun. 10, 2014 in corresponding JP Application No. 2013-131832 (with English translation).

*Primary Examiner* — Vishal Sahni
(74) *Attorney, Agent, or Firm* — Harness, Dickey & Pierce, P.L.C.

(57) ABSTRACT

A vibration damper for a conduit line. The damper includes a flexible body defining a bore and a slot adjacent to the bore. The body is flexible between a first configuration in which the slot has a first width that is insufficient to permit the conduit line to pass therethrough, and a second configuration in which the slot has a second width that is sufficient to permit the conduit line to pass therethrough, the second width is greater than the first width. The flexible body further includes a plurality of tuning splines. The tuning splines include a length and a width configured to reduce vibration of the conduit line when the damper is connected to the conduit line such that the conduit line extends through the bore.

16 Claims, 13 Drawing Sheets

(56) References Cited

FOREIGN PATENT DOCUMENTS

| JP | H03-11470 | 3/1991 |
|----|-----------|--------|
| JP | H10-169712 | 6/1998 |
| JP | H11-270751 | 10/1999 |
| JP | 2000-227194 | 8/2000 |
| JP | 2004-257668 | 9/2004 |
| JP | 2006-046535 | 2/2006 |

\* cited by examiner

SNAP ON VIBRATION DAMPER

FIELD

The present disclosure relates to a snap on vibration damper and method for installation.

BACKGROUND

This section provides background information related to the present disclosure, which is not necessarily prior art.

Undesirable fluidic noises and vibration can occur in a refrigerant line or a fluid line during phase change of the contents thereof, such as, for example, steering fluid, brake fluid, or fuel. To suppress these noises, a damper can be applied to the line. The damper often takes the form of high density tape wrapped around the fluid line or a heavy mass damper. For example, mastic tape is often used as a damping layer, but this petroleum based product can be difficult to work with and may become damaged at high temperatures. With respect to mass dampers, they undesirably add weight to the line and any vehicle that may include the line.

With respect to HVAC systems for example, most of the noises and vibration induced by the A/C compressor and the heater-core propagate from the inlet/outlet pipes associated with the evaporator and heater-core respectively. Increasing the length of the hoses attached to the inlet/outlet pipes attenuates the noise propagation to a certain extent. However, due to added weight, stiffness, and the unattractive appearance of the hoses, costly mufflers are sometimes used. Alternatively, unattractive viscous, mastic material is sometimes applied to tubes of standard length, which can also be costly and of limited effectiveness.

An example of an undesirable HVAC sound is the hissing and gurgling noise induced following air conditioning cycling. Its source is usually the sudden release and expansion of refrigerant at high pressure though the thermal expansion valve (TXV). This noise is often amplified through the grounding between the evaporator and the HVAC case. Furthermore, the noise transmits from inlet to outlet by way of the evaporator. To dampen this noise, the evaporator and tubes between the evaporator and the TXV are often wrapped with mastic material, which is costly and of limited effectiveness. Dampers can also be used to suppress compressor induced tones and/or growls propagating through air conditioner lines.

SUMMARY

This section provides a general summary of the disclosure, and is not a comprehensive disclosure of its full scope or all of its features.

The present teachings provide for a vibration damper for a conduit line. The damper includes a flexible body defining a bore and a slot adjacent to the bore. The body is flexible between a first configuration in which the slot has a first width that is insufficient to permit the conduit line to pass therethrough, and a second configuration in which the slot has a second width that is sufficient to permit the conduit line to pass therethrough, the second width is greater than the first width. The flexible body further includes a plurality of tuning splines. The tuning splines include a length and a width configured to reduce vibration of the conduit line when the damper is connected to the conduit line such that the conduit line extends through the bore.

The present teachings further provide for a vibration damper for a conduit line including an outer surface, an inner surface, a first side surface, a second side surface, and a slot. The inner surface is opposite to and spaced apart from the outer surface. The inner surface defines a bore configured to receive a length of the conduit line therein. The first and the second side surfaces extend between the outer surface and the inner surface. Each of the outer and inner surfaces extend between the first side surface and the second side surface parallel to a longitudinal axis of the damper. The slot is defined between a first end of the inner surface and a second end of the inner surface. The first end is opposite to and spaced apart from the second end. The slot extends parallel to the longitudinal axis.

The present teachings also provide for a method for dampening vibrations of a conduit line. The method includes positioning a vibration damper at the conduit line. The vibration damper includes a body and a plurality of tuning splines. The body defines a bore and a slot adjacent to the bore. The bore extends along a longitudinal axis of the body. The slot extends parallel to the longitudinal axis. The body is moved to a flexed configuration to provide the slot with a first width configured to permit the conduit line to pass through the slot and into the bore. The vibration damper is connected to the conduit line by pressing the damper onto the conduit line such that the conduit line passes through the slot and into the bore. As the damper is pressed onto the conduit line, the body moves from the flexed configuration to a relaxed configuration in which the slot has a second width that is smaller than the first to lock the vibration damper onto the conduit line. Each of the tuning splines includes a length and a width configured to reduce vibrations in the conduit line.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
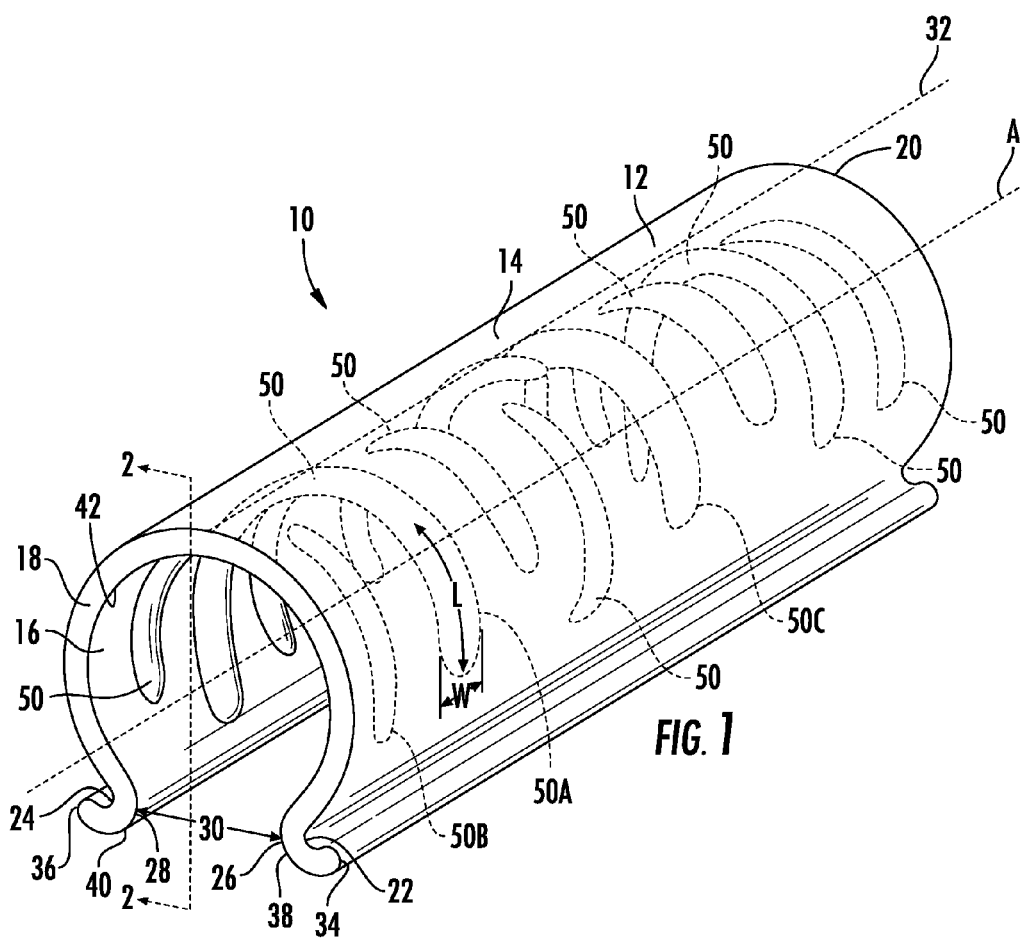
FIG. 1 is a perspective view of a damper according to the present teachings.
Figure 2:
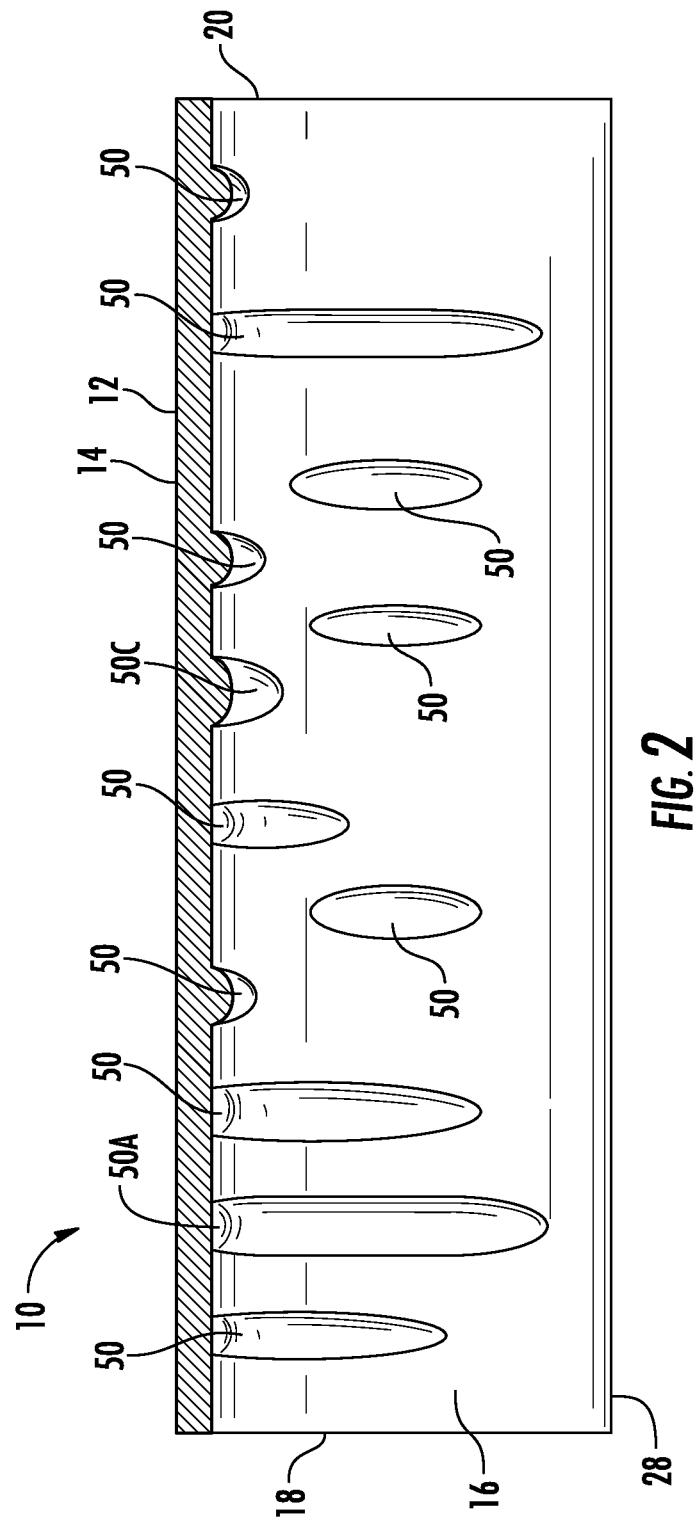
FIG. 2 is a cross-sectional view of the damper of FIG. 1 taken along line 2-2 of FIG. 1.
Figure 3:
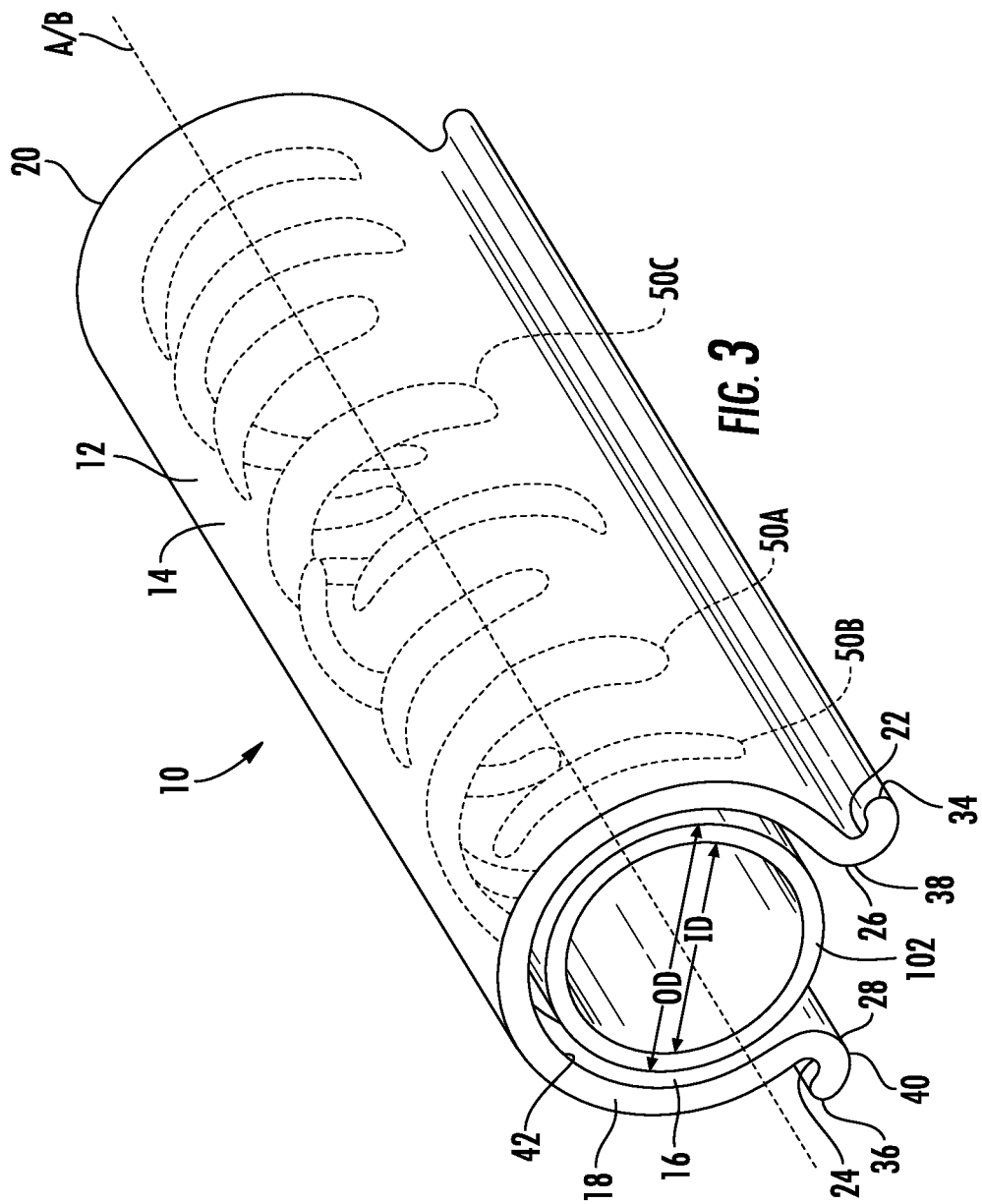
FIG. 3 is a perspective view of the damper of FIG. 1 connected to a conduit line.
Figure 4:
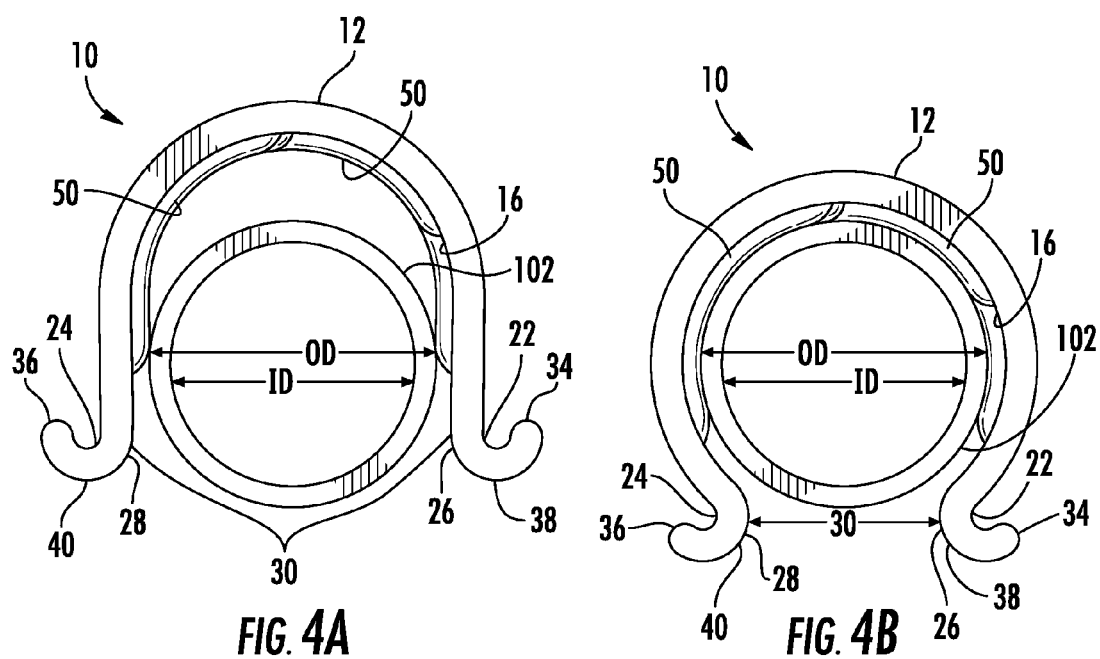
FIG. 4A is a side view of the damper of FIG. 1, the damper in an expanded configuration to permit connection of the damper to the conduit line.
FIG. 4B is a side view of the damper of FIG. 1, the damper connected to the conduit line.

Example embodiments will now be described more fully with reference to the accompanying drawings.

With initial reference to FIGS. 1-4, a damper according to the present teachings is generally illustrated at reference numeral 10. The damper 10 is generally configured for connection to a conduit line to dampen vibrations and noises of the conduit line, such as a fluid line or gas line, for example. The damper 10 can be connected to any suitable fluid line, such as a steering fluid line, a brake fluid line, a water line, a fuel line, or an HVAC line including refrigerant. The damper 10 can be connected to a conduit line of most any machine, such as automobiles, trucks, construction equipment, factory machinery, vending machines, coffee makers, ice machines, building HVAC systems, aircraft, locomotives, etc. The damper 10 dampens vibrations and noises generated by the conduit line itself, and/or the propagating contents of the conduit line. The damper 10 can further be used to protect the line to which it is attached from contact with rigid surfaces or sharp objects.

As illustrated in FIGS. 1-4 for example, the damper 10 generally includes a body 12 having an outer surface 14, an inner surface 16, a first side surface 18, and a second side surface 20. The outer surface 14 is opposite to, and spaced apart from, the inner surface 16. The outer surface 14 extends from the first side surface 18 to the second side surface 20 generally parallel to a longitudinal axis A of the body 12, which extends a length of the body 12. The outer surface 14 also extends about, or over, the longitudinal axis A between a first end 22 and a second end 24. The first and the second ends 22 and 24 extend parallel to the longitudinal axis from the first side surface 18 to the second side surface 20. The outer surface 14 is generally convex between the first end 22 and the second end 24 of the outer surface 14.

The inner surface 16 extends from the first side surface 18 to the second side surface 20 generally parallel to the longitudinal axis A of the body 12. The inner surface 16 also extends about, or over, the longitudinal axis A between a first end 26 of the inner surface 16 and a second end 28 of the inner surface 16. The first and the second ends 26 and 28 extend parallel to the longitudinal axis A from the first side surface 18 to the second side surface 20. The inner surface 16 is generally concave between the first end 26 and the second end 28. Between the first end 26 and the second end 28 of the inner surface 16, the body 12 defines a slot 30. The slot 30 also extends parallel to the longitudinal axis A. The slot 30 extends opposite to, and parallel to, an apex 32 of the body 12. The apex 32 is about halfway between the first end 22 of the outer surface 14 and the second end 24 of the outer surface 14.

The body 12 further includes a first lip 34 and a second lip 36. The first lip 34 extends from the first end 22 of the outer surface 14 and from the first end 26 of the inner surface 16. The second lip 36 extends from the second end 24 of the outer surface 14 and from the second end 28 of the inner surface 16.

The first lip 34 and the second lip 36 include a first curved undersurface 38 and a second curved undersurface 40 respectively. The first curved undersurface 38 and the second curved undersurface 40 are adjacent to the slot 30 on opposite sides thereof. The first lip 34 and the second lip 36 extend parallel to the longitudinal axis A along the length of the body 12.

The inner surface 16 defines a bore 42. The slot 30 is adjacent to the bore 42. The bore 42 is sized and shaped to accommodate any suitable conduit line therein, such as the cylindrical conduit line 102 of FIG. 3 for example. While the bore 42 is illustrated as being generally circular in cross-section, the bore 42 can have any suitable cross-sectional shape, such as square, hexagonal, etc. When the damper 10 is coupled to the conduit line 102, the damper 10 is oriented such that a longitudinal axis B of the conduit line 102 is aligned with the longitudinal axis A of the body 12. Coupling of the damper 10 to the conduit line 102 is described herein in conjunction with the description of FIGS. 4A and 4B.

The damper 10 further includes a plurality of tuning splines 50. As illustrated in the example of FIGS. 1-4, the splines 50 protrude from the inner surface 16. The splines 50 can be formed integral with the inner surface 16, such as during molding of the body 12. The splines 50 can also be mounted to the inner surface 16 in any suitable manner, such as with an adhesive or mechanical connection. The splines 50 can include any suitable material, such as rubber, plastic, any other suitable polymer, or nylon. The splines 50 are optional, and thus the damper 10 is also effective to dampen vibrations and noises without the splines 50.

The splines 50 are generally arranged to extend varying distances around the longitudinal axis A between the first end 26 and the second end 28 of the inner surface 16. The splines 50 thus each have a length L extending between any two points arranged between the first end 26 and the second end 28 of the inner surface 16, and a width W that extends parallel to the longitudinal axis A. Different splines 50 can be provided with different lengths and different widths. The splines 50 can have any suitable width and length. As illustrated, the splines 50 are generally evenly spaced apart along the longitudinal axis A between the first side surface 18 and the second side surface 20. However, the splines 50 can be provided at any suitable interval and any suitable number of splines 50 can be provided.

For example, of the splines 50, a first spline 50A includes a length L that extends nearly entirely from the first end 26 of the inner surface 16 to the second end 28 of the inner surface 16. The length L of the first spline 50A is greater than a length of a second spline 50B, which extends from about the first end 26 of the inner surface 16 and terminates prior to reaching the apex 32 of the body 12. The first spline 50A has a width W extending in the direction of the longitudinal axis A, which is greater than a width of the second spline 50B. A third spline 50C extends across the apex 32 of the body 12, but not as far to either the first end 26 or the second end 28 of the inner surface 16 as the first spline 50A does. The third spline 50C has a width similar to the width W of the first spline 50A.

Based on principles of frequency analytics, the damper 10 can be tuned to suppress vibrations and noises depending on the dimensions of the conduit line that the damper 10 is to be mounted to, and/or the contents thereof. With respect to the dimensions of the conduit line, tuning can be based on, for example, the length of the conduit line, the outer diameter OD of the conduit line, and/or the inner diameter ID of the conduit line. The damper 10 can be tuned by varying, for example, the length of the damper 10 as a whole along the longitudinal axis A, the number of splines 50, the spacing of the splines 50, the length L of the splines 50, and/or the width W of the splines

50. Generally, the greater the inner diameter ID and the outer diameter OD of the conduit line 102, the greater the number of splines 50 provided, and the greater the length L and width W of the splines 50.

The frequency of the noise to be dampened can also be taken into consideration when tuning the damper 10. For example, if a higher frequency noise is to be dampened, the body 12 can be provided with a shorter overall length along the longitudinal axis A than if a lower frequency noise is to be dampened. With respect to the arrangement and number of splines 50, the effectiveness of the damper 10 will be increased if, as compared to when a low frequency noise/vibration is to be dampened, the splines 50 are provided in greater numbers, spaced at smaller intervals, have greater widths W, and longer lengths L.

The body 12 can be made of any suitable flexible material, such as any suitable polymer, including natural or synthetic rubber. The body 12 can be made of recycled material. The body 12 can include a variety of different materials, with similar or different hardnesses, or the same material throughout. The body 12 is flexible between a relaxed configuration, as illustrated in FIGS. 1-3 and 4B for example, and an expanded or flexed configuration, as illustrated in FIG. 4A for example. In the flexed configuration of FIG. 4A, the first end 26 and the second end 28 of the inner surface 16 are moved further apart to provide the slot 30 with an increased width, as compared to the width of the slot 30 when in the relaxed configuration of FIGS. 1-3 and 4B. The width of the slot 30 is the distance between the first end 26 and the second end 28. The body 12 can include a shape memory material such that the relaxed configuration is generally the same before and after the body 12 is expanded to the flexed configuration of FIG. 4A.

In the expanded or flexed configuration of FIG. 4A, the slot 30 has a width sufficient to accommodate the conduit line 102. In particular, the width of the slot 30 is increased such that it is greater than the outer diameter OD of the conduit line 102. As a result, the damper 10 can be mounted to the conduit line 102 by pressing the body 12 over and onto the conduit line 102. As the damper 10 is pressed onto the conduit line 102, the first and the second curved undersurfaces 38 and 40 of the first and the second lips 34 and 36 contact the conduit line 102 and are forced apart from one another, which causes the width of the slot 30 to increase. After the first lip 34 and the second lip 36 pass over the largest portion of the outer diameter OD of the conduit line 102, the width of the slot 30 begins to decrease and ultimately returns to, or closely proximate to, the relaxed configuration of FIGS. 1-3 and 4B in order to retain the conduit line 102 within the bore 42 and to fasten the damper 10 to the conduit line 102, as illustrated in FIG. 4B. The damper 10 can be connected to the conduit line 102 in any other suitable manner as well, such as with an adhesive, straps, bands, clips, etc.

Figure 5:
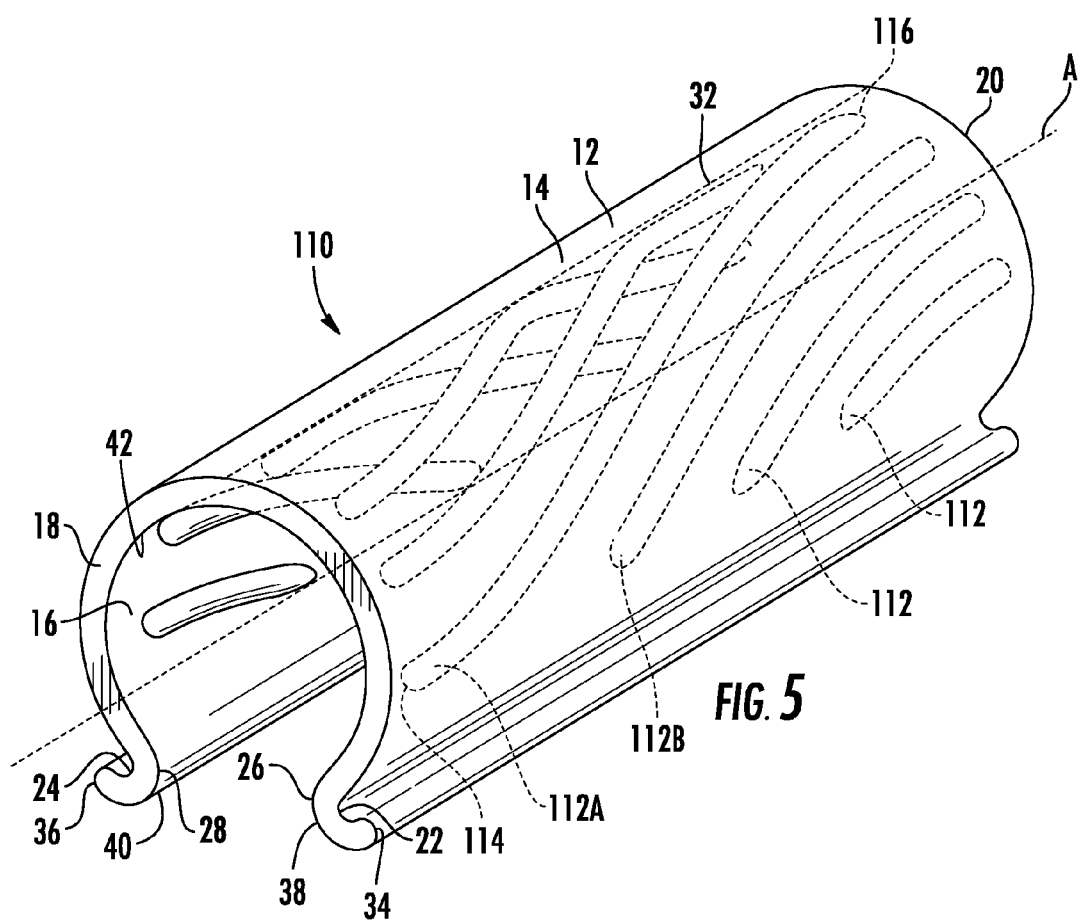
FIG. 5 is a perspective view of another damper according to the present teachings.

An additional damper according to the present teachings is illustrated in FIG. 5 at reference numeral 110. The damper 110 is substantially similar to the damper 10, and thus similar features are designated with the same reference numbers. The damper 110 includes a plurality of splines 112. The primary difference between the damper 110 and the damper 10 is the arrangement and orientation of the splines 112, which are similar to the splines 50 of the damper 10. The splines 112 extend from the inner surface 16, like the splines 50. The splines 112 are generally oriented such that they extend in a helical manner along the length of the inner surface 16, which extends parallel to the longitudinal axis A between the first side surface 18 and the second side surface 20.

For example, of the splines 112 the first spline 112A extends nearly the entire length of the inner surface 16 from the first side surface 18 to the second side surface 20. The first spline 112A extends in a helical manner such that a first end 114 of the first spline 112A is proximate to the first lip 34 and a second end 116 of the first spline 112A is proximate to the apex 32 of the body 12 proximate to the second side surface 20. Other splines 112, such as the second spline 112B, extend along the length of the body 12, but across a shorter distance of the outer surface 14. For example, the second spline 112B extends about half the length of the damper 110, from about a midpoint of the length of the damper 10 proximate to the first lip 34 to about the second side surface 20 proximate to the apex 32 of the body 12. While the splines 112 are generally illustrated as being evenly spaced apart and having similar widths, any suitable number of splines 112 can be provided spaced apart at any suitable interval and having any suitable width in order to adequately dampen vibrations and noises generated within the conduit line 102.

Figure 6:
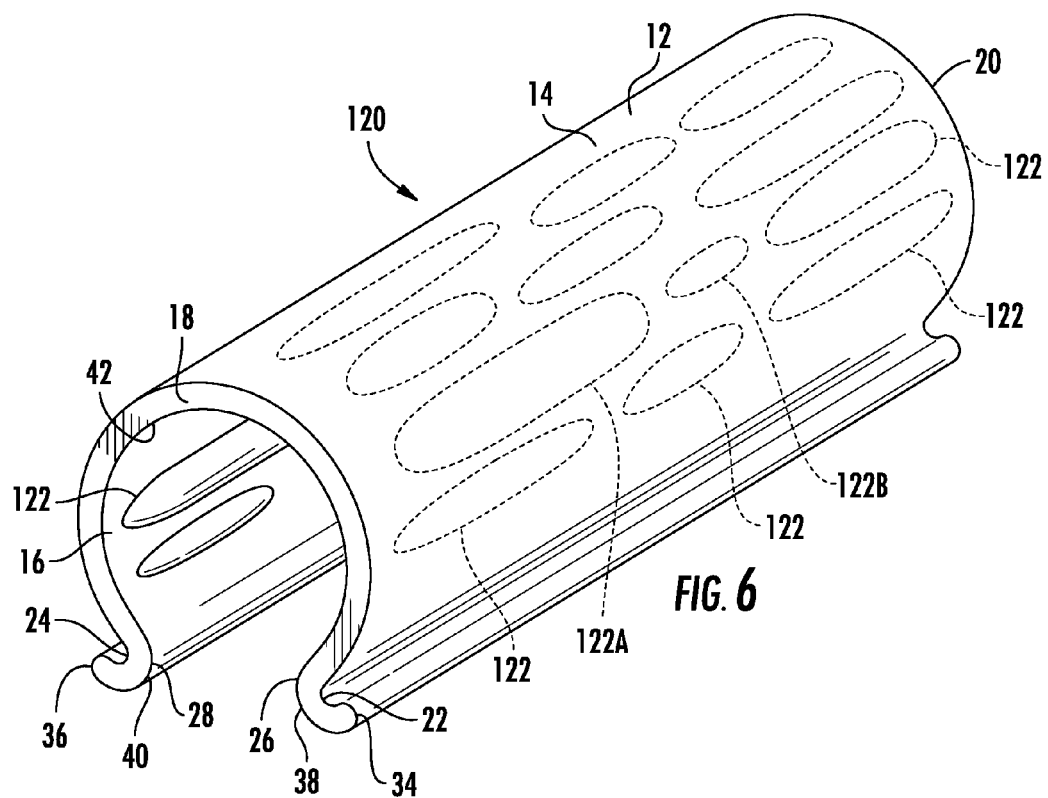
FIG. 6 is a perspective view of an additional damper according to the present teachings.

With additional reference to FIG. 6, an additional damper 120 is illustrated. The damper 120 is substantially similar to the damper 10, and thus the similar features are designated with the same reference numbers. The damper 120 includes a plurality of splines 122, which protrude from the inner surface 16 of the body 12. The primary difference between the damper 10 and the damper 120 is the arrangement of the splines 122, which are otherwise similar to the splines 50 of the damper 10. The splines 122 have a length that extends generally parallel to the longitudinal axis A and a width that extends across a portion of the inner surface 16 between the first and the second ends 26 and 28 of the inner surface 16 generally perpendicular to the length.

The splines 122 extend at various distances along the length of the damper 120 between the first side surface 18 and the second side surface 20, and have varying widths. For example, of the splines 122 the first spline 122A has a length extending from the first side surface 18 to a point about halfway across the inner surface 16. The second spline 122B extends a shorter distance between the first and the second sides 18 and 20 than the first spline 122A does. Further, the second spline 122B has a smaller width than the first spline 122A does. Any suitable number of splines 122 spaced apart at any suitable interval can be provided, and the splines 122 can have any suitable width or length in order to suitably dampen vibrations and/or noises within the conduit line 102.

Figure 7:
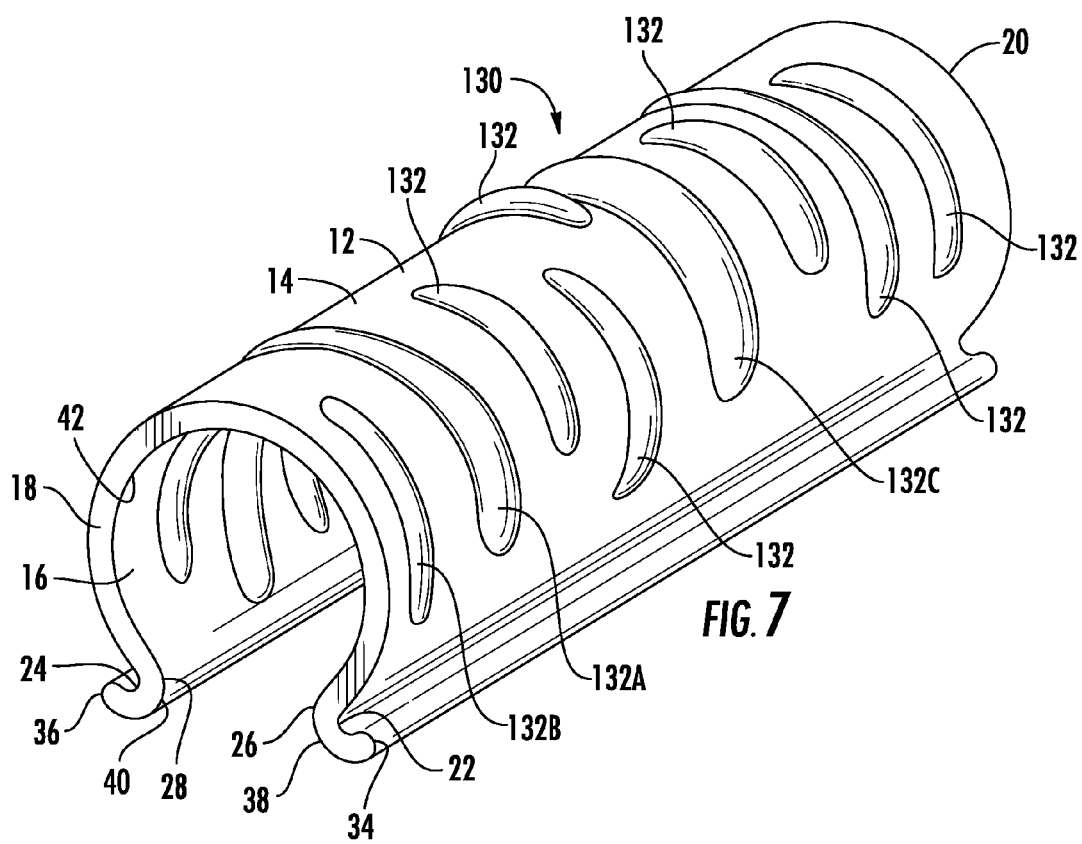
FIG. 7 is a perspective view of yet another damper according to the present teachings.

With additional reference to FIG. 7, an additional damper 130 is illustrated. The damper 130 is substantially similar to the damper 10, and thus the similar features are designated with the same reference numbers. The damper 130 includes a plurality of splines 132. The splines 132 extend from the outer surface 14 of the body 12, but otherwise are substantially similar to the splines 50 of the damper 10. Therefore, the description of the splines 50 generally applies to the splines 132.

Figure 8:
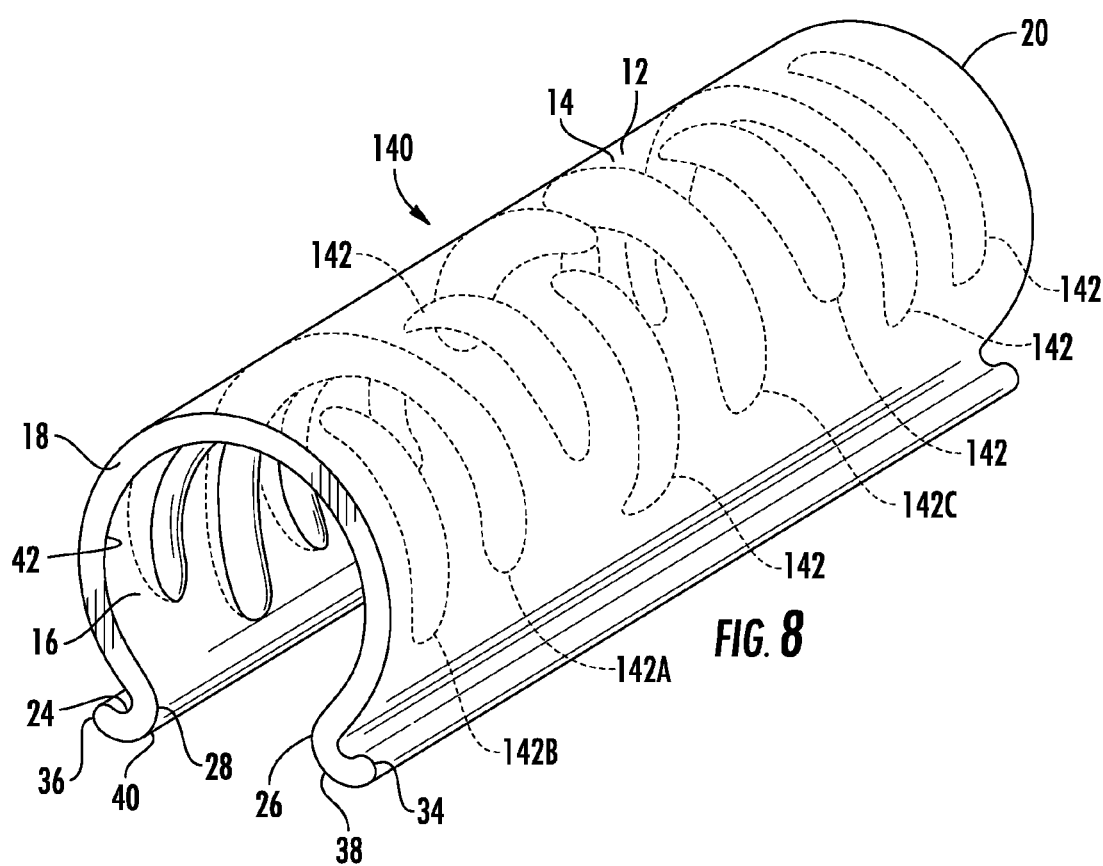
FIG. 8 is a perspective view of still another damper according to the present teachings.

With additional reference to FIG. 8, an additional damper 140 is illustrated. The damper 140 is substantially similar to the damper 10, and thus the similar features are designated with the same reference numbers. The damper 140 includes a plurality of splines 142, which are recessed within the inner surface 16 of the body 12, but otherwise are substantially similar to the splines 50 of the damper 10. Therefore, the description of the splines 50 generally applies to the splines 142.

Figure 9:
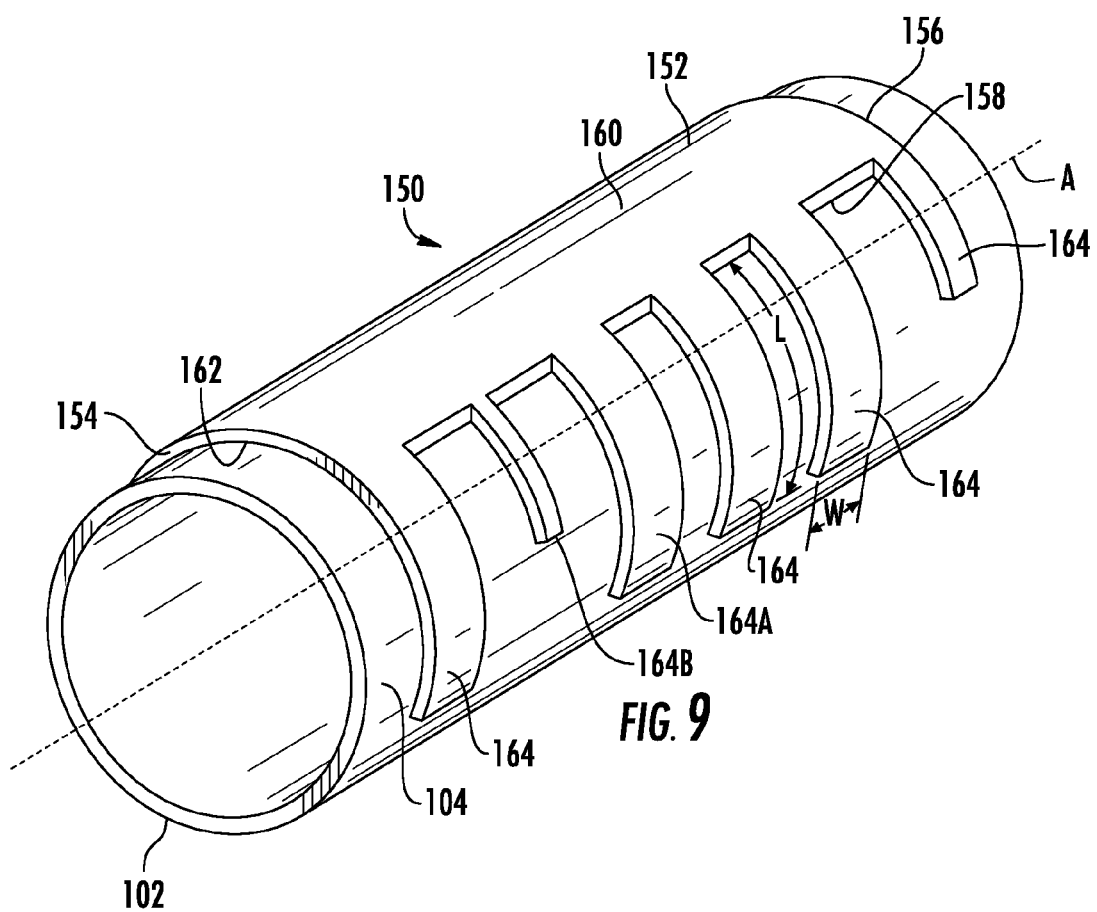
FIG. 9 is a perspective view of an additional damper according to the present teachings.

With additional reference to FIG. 9, another damper 150 is illustrated. The damper 150 generally includes a body 152. The body 152 includes a first side 154, a second side 156, a first end 158, and a second end (not shown). The first side 154 is opposite to the second side 156 and the first end 158 is opposite to the second end. Extending between the first side 154 and the second side 156, as well as between the first end 158 and the second end is an outer surface 160. An inner surface 162 is opposite to the outer surface 160 and arranged to abut the conduit line 102 when the damper 150 is mounted thereto, as illustrated in FIG. 9.

Extending from each of the first end 158 and the second end are a plurality of splines 164. The splines 164 and the inner surface 162 of the body 152 are generally curved to approximate a curvature of an exterior surface 104 of the conduit line 102. Any suitable number of splines 164 can be provided. The splines 164 can be evenly spaced apart or spaced apart at non-uniform intervals. The splines 164 can extend from the body 152 at a variety of different distances, and can have various different widths. For example, of the splines 164, a first spline 164A can extend further from the first end 158 than a second spline 164B, and thus the first spline 164A has a greater length L than the second spline 164B does. The first spline 164A can also include a larger width W (measured along a line parallel to the longitudinal axis A) than the second spline 164B. Similar to the splines 50, the specific number, width, length, and spacing, of the splines 164 can be customized to dampen vibrations and/or sound within the conduit line 102 based on results of frequency analysis performed on the conduit line 102, as set forth above in the description of the tuning of the damper 10.

Figure 10:
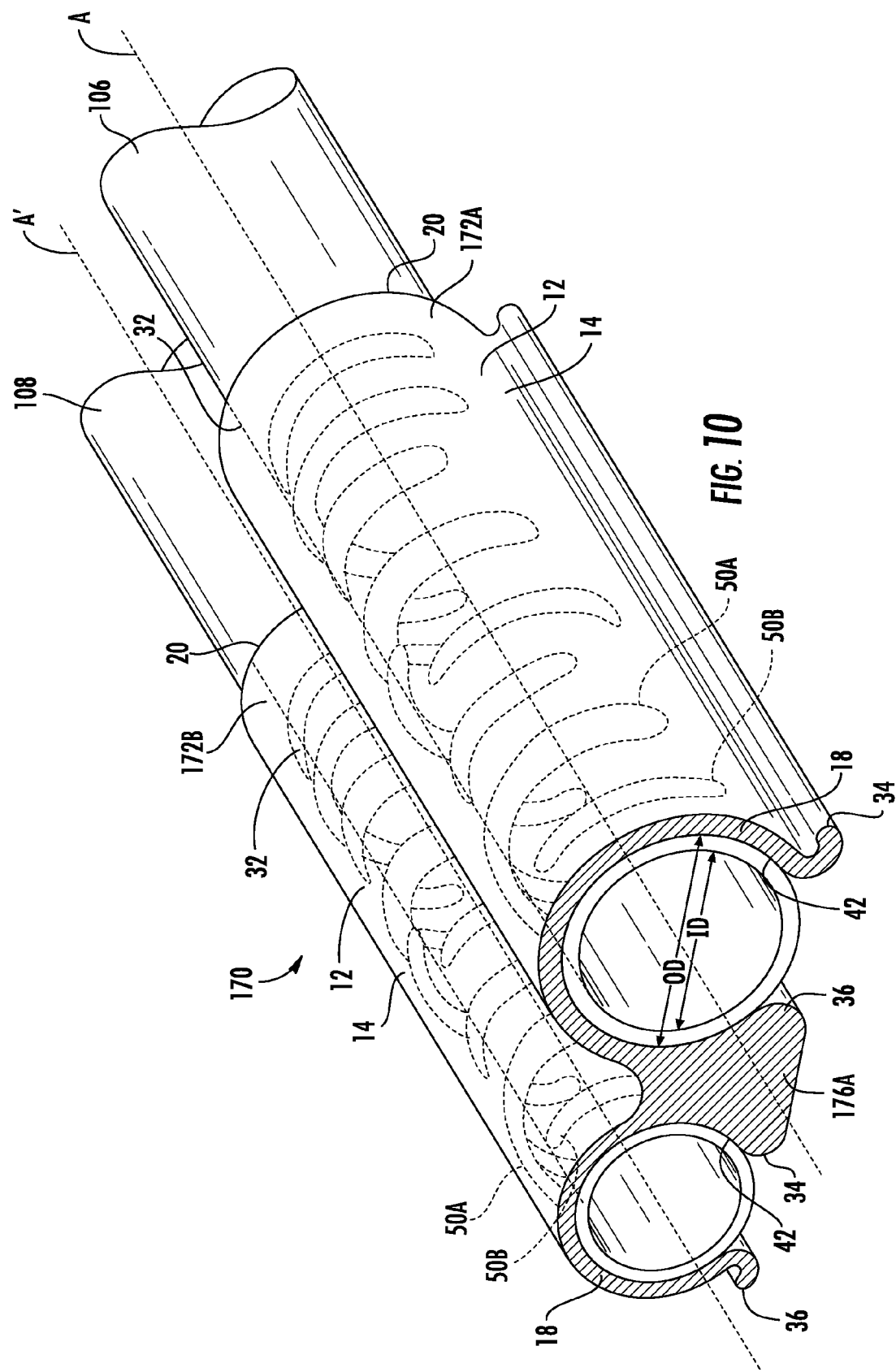
FIG. 10 is a perspective view of a damper assembly according to the present teachings, the damper assembly connected to a pair of conduit lines.

With additional reference to FIG. 10, a damper assembly is generally illustrated at reference number 170. The damper assembly 170 generally includes a first damper 172A and a second damper 172B. The first damper 172A and the second damper 172B are each substantially similar to the damper 10, and thus similar features are designated with similar reference numbers. The first damper 172A and the second damper 172B are also similar to one another. The bore 42 of the first damper 172A includes a larger diameter than the bore 42 of the second damper 172B to accommodate first conduit line 106, which has a larger outer diameter than second conduit line 108.

The first damper 172A is connected to the second damper 172B with a first connection portion 176A. The first connection portion 176A connects and orients the first damper 172A and the second damper 172B such that the longitudinal axis A of the first damper 172A and the longitudinal axis A' of the second damper 172B extend parallel to one another. The connection portion 176A is arranged between the first damper 172A and the second damper 172B and spaces the first damper 172A apart from the second damper 172B.

The connection portion 176A is integral with second lip 36 of the first damper 172A and the first lip 34 of the second damper 172B. The connection portion 176A is also integral with the outer surface 14 of the first damper 172A and the outer surface 14 of the second damper 172B. The connection portion 176A extends from the second lip 36 of the first damper 172A along the outer surface 14 of the first damper 172A, and terminates prior to reaching the apex 32 of the first damper 172A. Similarly, the connection portion 176A extends from the first lip 34 of the second damper 172B along the outer surface 14 of the second damper 172B, and terminates prior to reaching the apex 32 of the second damper 172B.

Due in part to the configuration of the splines 50 of the first and second dampers 172A and 172B, the damper assembly 170 dampens vibrations and/or sounds emanating from within the first conduit line 106 and the second conduit line 108. The connection portion 176A also facilitates alignment of the first conduit line 106 with respect to the second conduit line 108. While the damper assembly 170 is described as including the splines 50, the damper assembly 170 can include any of the other splines 112, 122, 132, 142, or 164 described herein, as well as any other spline configuration to adequately dampen vibration and/or noise emanating from within the first conduit line 106 or the second conduit line 108.

Figure 11:
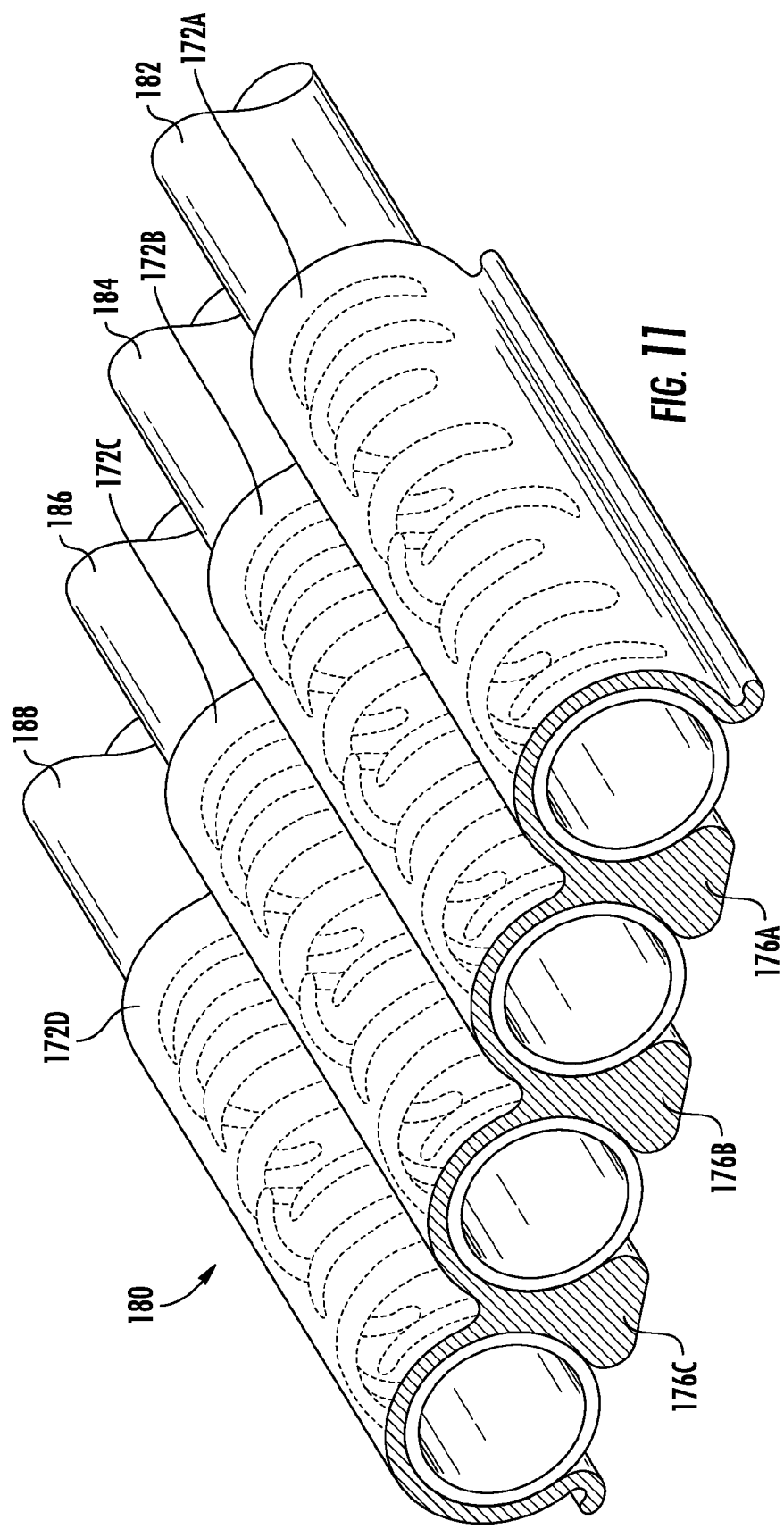
FIG. 11 is a perspective view of an additional damper assembly according to the present teachings, the damper assembly connected to four conduit lines.

With additional reference to FIG. 11, another damper assembly according to the present teachings is generally illustrated at reference number 180. The damper assembly 180 is substantially similar to the damper assembly 170, but is configured to accommodate a first conduit line 182, a second conduit line 184, a third conduit line 186, and a fourth conduit line 188, each of which have the same inner diameter and the same outer diameter. Thus, in addition to the first damper 172A and the second damper 172B of the damper assembly 170, the damper assembly 180 includes a third damper 172C and a fourth damper 172D, each of which are substantially similar to the first and second dampers 172A and 172B. Therefore, the description of the first and the second dampers 172A and 172B also describes the third and the fourth dampers 172C and 172D, although the second damper 172B of the damper assembly 180 is larger than the second damper 172B of the damper assembly 170 to accommodate the conduit line 184, which has a larger inner diameter and outer diameter than the second conduit line 108 and has the same inner diameter and outer diameter as the conduit line 182.

The damper assembly 180 also includes, in addition to the first connection portion 176A, a second connection portion 176B, and a third connection portion 176C. Each of the second and the third connection portions 176B and 176C are substantially similar to the first connection portion 176A. The second connection portion 176B is arranged between the second damper 172B and the third damper 172C. The third connection portion 176C is arranged between the third damper 172C and the fourth damper 172D. The second and the third connection portions 176B and 176C are configured to maintain the third and the fourth conduit lines 186 and 188 spaced apart from one another and retained at a predetermined distance from one another. While the damper assembly 180 includes four dampers 172A-172D and three connection portions 176A-178C to accommodate four conduit lines 182-188, any suitable number of dampers 172 and connection portions 176 can be included to accommodate any suitable number of conduit lines. Furthermore, while the dampers 172A-172D are illustrated as having generally the same size, any one of the dampers 172A-172D can be provided with any suitable size to accommodate conduit lines of most any size.

Figure 12:
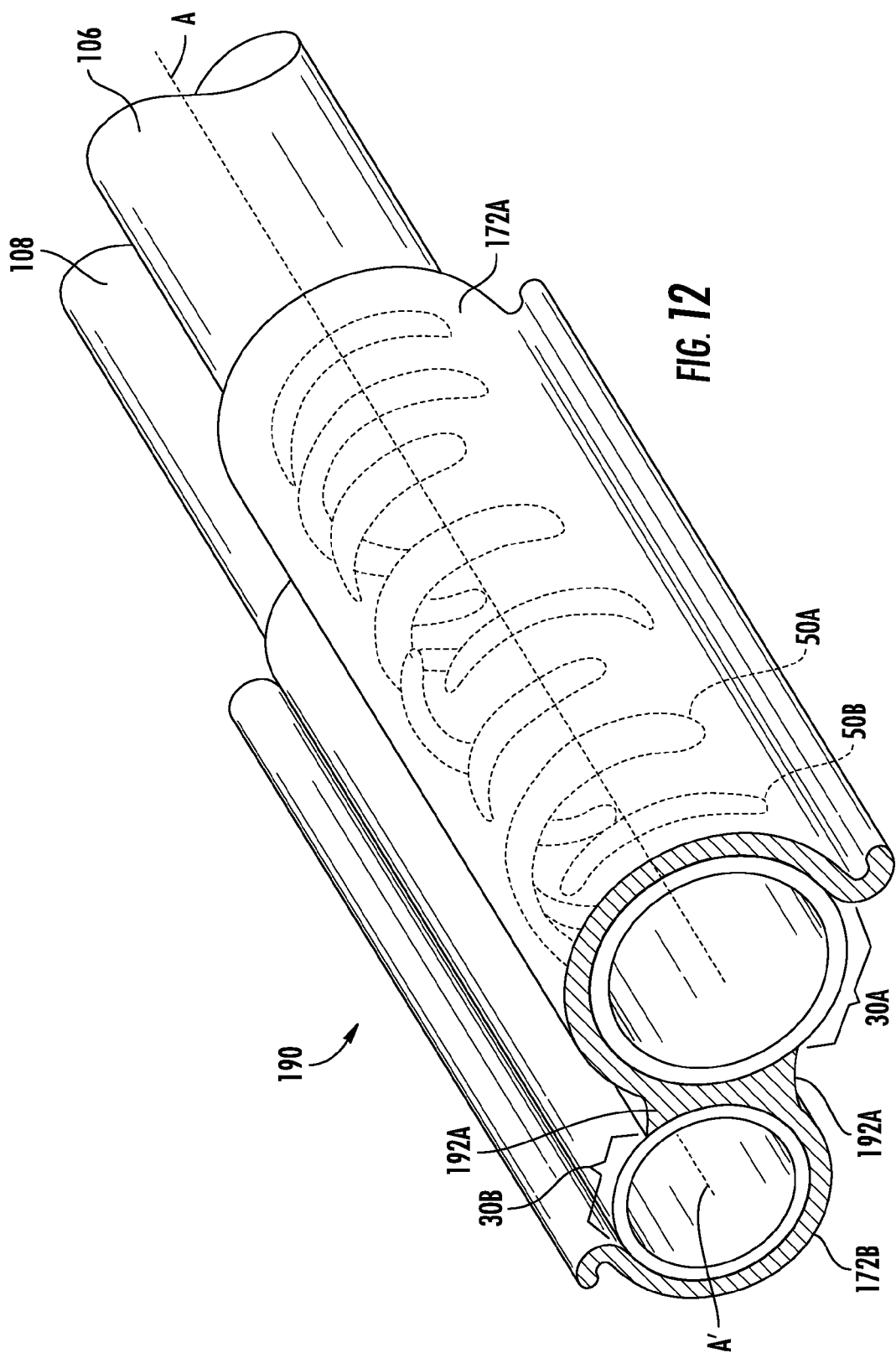
FIG. 12 is a perspective view of an opposing damper assembly according to the present teachings, the opposing damper assembly connected to a pair of conduit lines.

With additional reference to FIG. 12, an opposing damper assembly is generally illustrated at reference numeral 190. The opposing damper assembly 190 includes many features that are similar to features of the damper assembly 170, and thus the similar features are designated with like reference numbers. Like the damper assembly 170, the opposing damper assembly 190 includes the first damper 172A and the second damper 172B, which are sized and configured to connect to the first conduit line 106 and the second conduit line 108 respectively. However, the first and the second dampers 172A and 172B are oriented in opposite directions. For example, the first and the second dampers 172A and 172B are oriented such that their slots 30A and 30B respectively do not extend along the longitudinal axes A and A' in the same plane, but rather in spaced apart planes on opposite sides of the longitudinal axes A and A'. In place of the connection portion 176, the opposing damper assembly includes a first connection portion 192A, which is between and integral with both the first and the second dampers 172A and 172B, and thus connects the first and the second dampers 172A and 172B together. The first connection portion 192A takes the place of the second lip 36 of each of the first damper 172A and the second damper 172B, and thus partially defines the slots 30A and 30B. The opposing damper assembly 190 may, in some applications, more securely connect the first and the second dampers 172A and 172B with one another and maintain the first and the second dampers 172A and 172B in alignment with one another.

Figure 13:
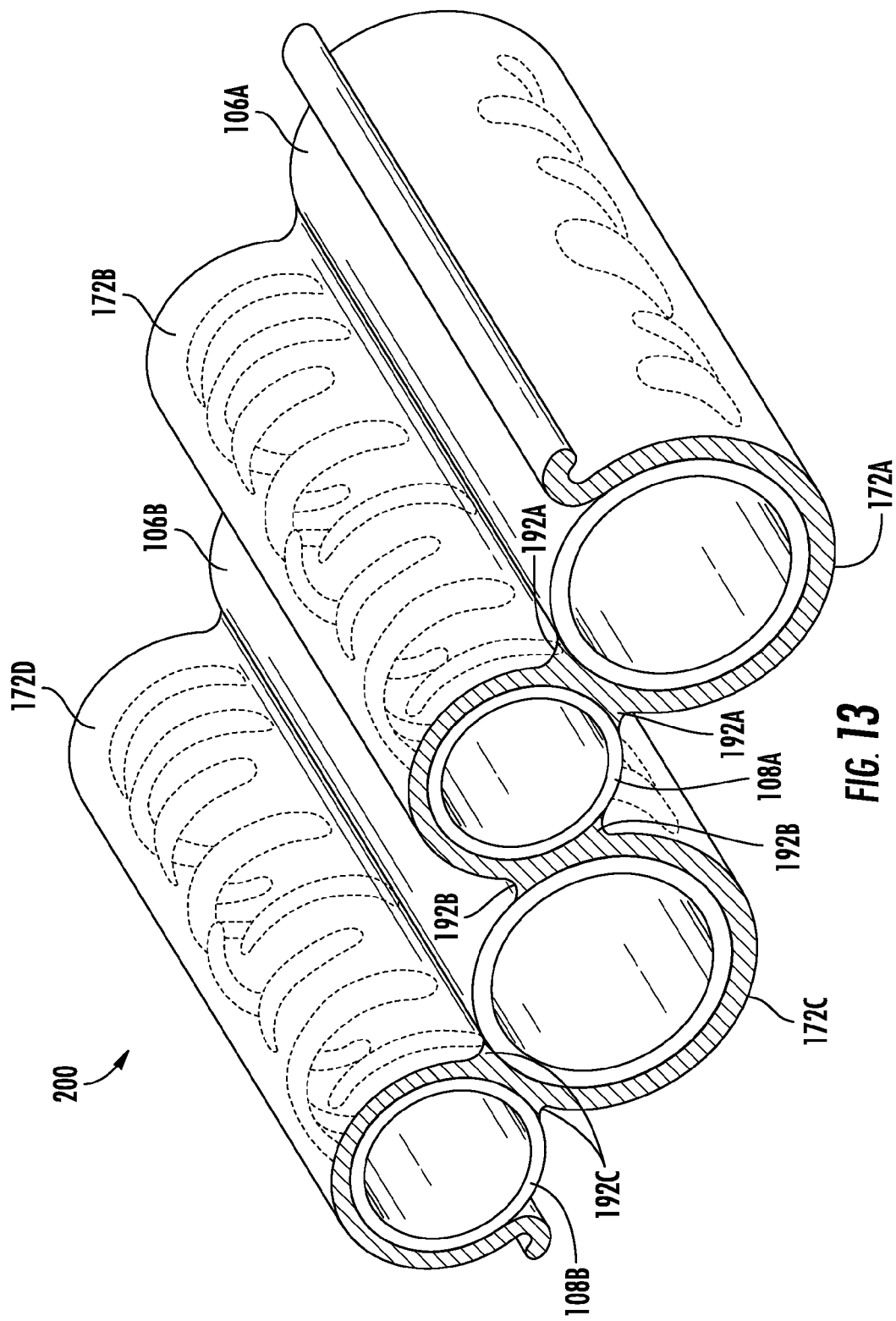
FIG. 13 is a perspective view of an alternative damper assembly according to the present teachings, the alternating damper assembly connected to four conduit lines.

With additional reference to FIG. 13, an alternating damper assembly is illustrated at reference numeral 200. The alternating damper assembly 200 is similar to the opposing damper assembly 190 of FIG. 12, but further includes a third damper 172C and a fourth damper 172D. The first and the third dampers 172A and 172C are oriented in a similar direction to each other. The second and the fourth dampers 172B and 172D are also oriented in a similar direction to each other, but are oriented in a direction opposite to that in which the first and the third dampers 172A and 172C are oriented. Between the second damper 172B and the third damper 172C is a second connection portion 192B, and between the third damper 172C and the fourth damper 172D is a third connection portion 192C. The second and the third connection portions 192B and 192C are substantially similar to the first connection portion 192A. In addition to dampening vibrations and noise, the alternating damper assembly 200 is configured to maintain alignment between conduit lines biased to move in opposite directions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vibration damper for a conduit line comprising:
   a flexible body defining a bore and a slot adjacent to the bore, the body flexible between a first configuration in which the slot has a first slot width that is insufficient to permit the conduit line to pass therethrough, and a second configuration in which the slot has a second slot width that is sufficient to permit the conduit line to pass therethrough, the second slot width is greater than the first slot width; and
   a plurality of tuning splines included with the flexible body, the tuning splines including a spline length and a spline width configured to reduce vibration of the conduit line when the damper is connected to the conduit line such that the conduit line extends through the bore;
   wherein:
   the flexible body includes a first end and a second end which define the slot therebetween, and includes a first side and a second side, which defines a longitudinal length of the flexible body;
   the plurality of the tuning splines extend along the spline length between the first end and the second end at varying distances around a longitudinal axis of the flexible body, and are spaced apart along the longitudinal axis between the first side and the second side; and
   the spline length is always greater than the spline width, which is parallel to the longitudinal length.

2. The vibration damper of claim 1, wherein the tuning splines are spaced apart along the longitudinal length of the flexible body at uniform intervals.

3. The vibration damper of claim 1, wherein the plurality of tuning splines includes a first tuning spline and a second tuning spline, the first tuning spline has a first spline width that is greater than a second spline width of the second tuning spline.

4. The vibration damper of claim 3, wherein the first tuning spline has a first spline length that is greater than a second spline length of the second tuning spline.

5. The vibration damper of claim 3, wherein the first tuning spline has a first spline length that is less than a second spline length of the second tuning spline.

6. The vibration damper of claim 1, wherein the tuning splines protrude outward from an inner surface of the body into the bore.

7. The vibration damper of claim 1, wherein the tuning splines protrude outward from an outer surface of the body.

8. The vibration damper of claim 1, wherein the tuning splines are recessed within the body.

9. The vibration damper of claim 1, wherein the flexible body is a first flexible body, and the damper includes a second flexible body connected to the first flexible body with a connection portion.

10. The vibration damper of claim 9, wherein the first flexible body and the second flexible body are oriented in opposite directions.

11. The vibration damper of claim 1, wherein to reduce a first frequency greater than a second frequency, the tuning splines have at least one of a first spline length or a first spline width each of which is greater than a second spline length and a second spline width respectively configured to damp the second frequency.

12. The vibration damper of claim 1, wherein:
   the bore extends in an axial direction of the flexible body and a curved circumferential surface of the flexible body is disposed around the bore; and
   each of the tuning splines define the spline length around the curved circumferential surface of the flexible body and the width extending in the axial direction of the flexible body.

13. The vibration damper of claim 1, wherein the plurality of tuning splines are spaced from each other in a longitudinal direction of the flexible body.

14. The vibration damper of claim 1, wherein each of the plurality of tuning splines is adjacent another one of the plurality of tuning splines in a longitudinal direction of the flexible body.

15. The vibration damper of claim 1, wherein at least two of the plurality of tuning splines pass through an apex of the flexible body, the apex being defined as halfway between a first circumferential end and a second circumferential end of the slot in a circumferential direction.

16. A vibration damper for a conduit line comprising:
   a flexible body defining a bore and a slot adjacent to the bore, the body flexible between a first configuration in which the slot has a first slot width that is insufficient to permit the conduit line to pass therethrough, and a second configuration in which the slot has a second slot width that is sufficient to permit the conduit line to pass therethrough, the second slot width is greater than the first slot width; and
   a plurality of tuning splines included with the flexible body, the tuning splines including a spline length and a spline width configured to reduce vibration of the conduit line when the damper is connected to the conduit line such that the conduit line extends through the bore;
wherein:
the flexible body includes a first end and a second end, which define the slot therebetween, and includes a first side and a second side, which define a longitudinal length of the flexible body; and
the plurality of tuning splines have different lengths extending between the first end and the second end and different widths extending parallel to the longitudinal length.

* * * * *